May 4, 1965     R. C. MANINGER     3,181,365
THERMAL NOISE INVESTIGATION
Filed Jan. 9, 1961     2 Sheets-Sheet 1
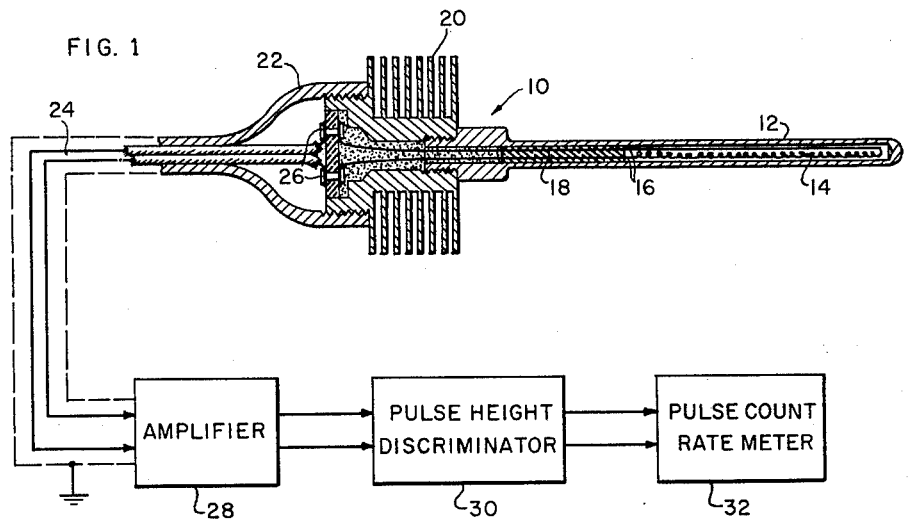
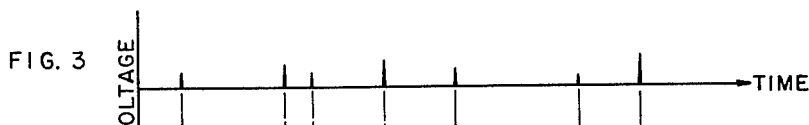
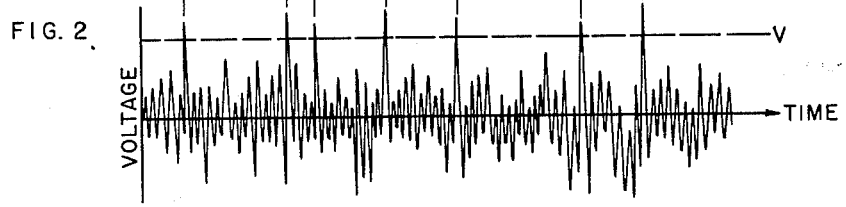
INVENTOR.
R. CARROLL MANINGER
ATTORNEY May 4, 1965  R. C. MANINGER  3,181,365
THERMAL NOISE INVESTIGATION
Filed Jan. 9, 1961  2 Sheets-Sheet 2
FIG. 4
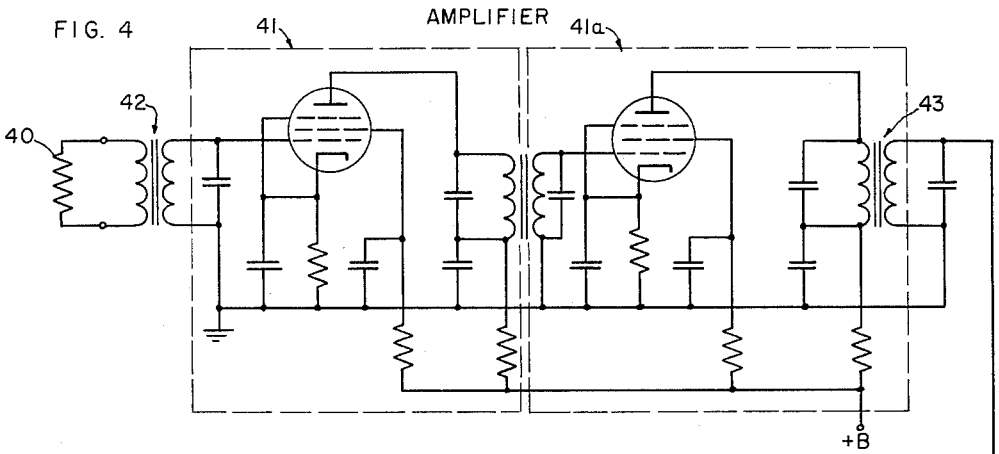
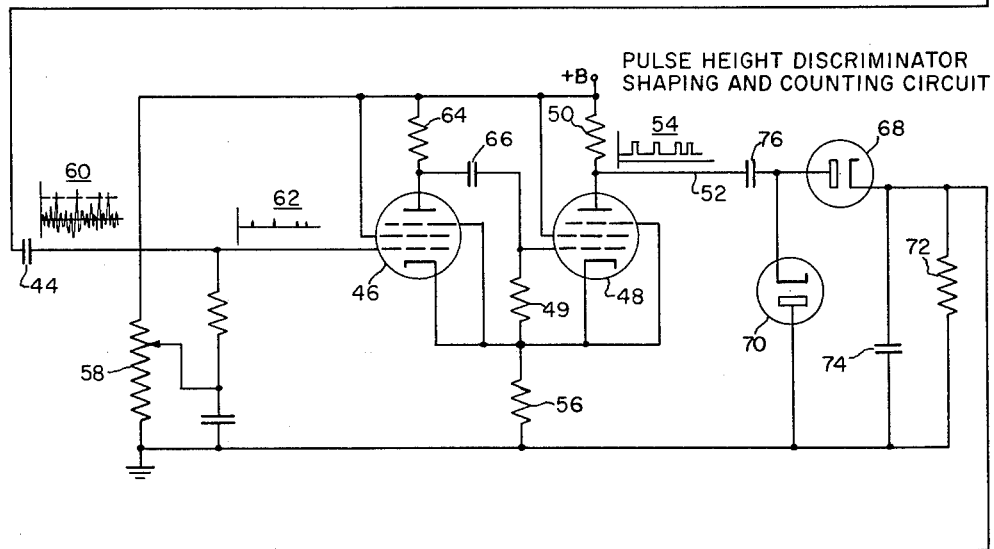
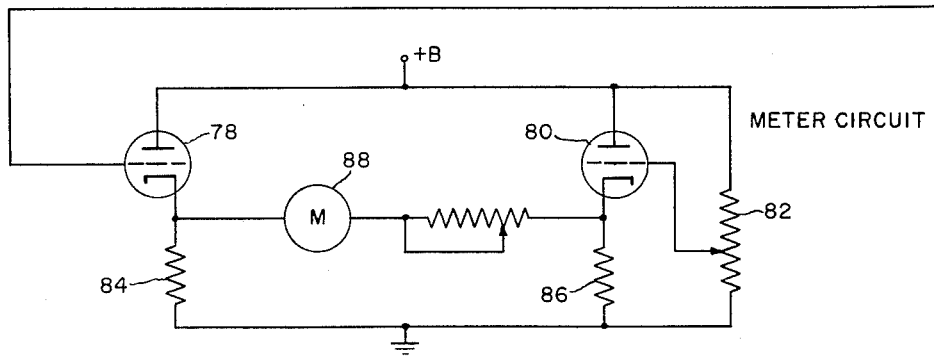

United States Patent Office 3,181,365
Patented May 4, 1965

3,181,365
THERMAL NOISE INVESTIGATION
Ralph Carroll Maninger, Los Altos, Calif., assignor to General Precision, Inc., a corporation of Delaware
Filed Jan. 9, 1961, Ser. No. 81,408
8 Claims. (Cl. 73—362)

This invention relates to a novel and improved temperature measurement device and more particularly to a novel and improved device for determining temperature by the measurement of the frequency of thermal noise voltage generated in a resistance.

It is well known that heat applied to an electrically conductive material will cause a thermal agitation within the material which produces thermal fluctuations in voltage between two points on the material. If heat is applied to a resistance, it has been shown theoretically and proven experimentally by H. Nyquist (Physical Review, vol. 32, July 1928) that the thermal fluctuations in voltage produced across the resistance is related to the absolute temperature of the resistance element, the resistance of the element, the bandwidth frequencies of the associated circuitry, and the Boltzmann constant. This relationship may be expressed by the equation:

$$E_{R.M.S.} = \sqrt{4KTR\Delta f} \qquad \text{(Eq. 1)}$$

where
$K$=Boltzmann's constant
$T$=Absolute temperature (° K)
$R$=Real part of the complex impedance of the network (ohms)
$\Delta f$=Circuit bandwidth (c.p.s.)

Many attempts have been made to develop instruments that will accurately measure absolute temperatures by measurement of $E_{R.M.S.}$ in the Nyquist equation. One system employed by the National Bureau of Standards (NBS Report 3471, July 1954) adjusts a resistance element at a known temperature against a resistance element at an unknown temperature to obtain a comparison from which the unknown temperature may be computed. The results obtained are satisfactory to a certain degree; the main disadvantage is the time required to make a single measurement.

The present invention makes use of not only the Nyquist equation but also an equation presented by S. O. Rice (Bell System Technical Journal, July 1944–Jan. 1945) which relates the number of pulses per unit time that exceed an arbitrarily predetermined voltage amplitude to the bandpass frequencies of the circuit and to the R.M.S. noise voltage of the Nyquist equation. The relationship is expressed by the equation:

$$N = \left[\frac{1}{3}\frac{f_b^3 - f_a^3}{f_b - f_a}\right]^{1/2} e^{-V^2/2E^2_{R.M.S.}} \qquad \text{(Eq. 2)}$$

where
$N$=Number of voltage peaks per second that exceed the arbitrarily predetermined voltage $V$
$f_b$=Upper frequency limit of the bandpass circuit
$f_a$=Lower frequency limit of the bandpass circuit
$E_{R.M.S.}$=Noise voltage as given by Equation 1

Since in any electronic amplifying circuit the upper and lower frequency limits may be maintained constant, $$\left[\frac{1}{3}\frac{f_b^3 - f_a^3}{f_b - f_a}\right]^{1/2} = \text{constant} = k$$

the Nyquist equation may be combined with the Bell equation to solve for temperature to become $$T = \frac{-V^2}{8AKR(f_b - f_a)[\ln N - \ln k]} \qquad \text{(Eq. 3)}$$

where $A$ is the gain of the electronic amplifier.

Examination of Eq. 3 shows that for any given amplifier and temperature sensing resistance element the values of $A$, $K$, $R$, and $(f_b - f_a)$ will be constants. If the amplifier is coupled to a discriminator in which an arbitrary bias or threshold voltage is provided so that only voltage peaks that exceed that threshold voltage will reach the output, that threshold voltage, $V$, is also a constant. Therefore, Eq. 3 may be rewritten to become:

$$T = \frac{B}{\ln N - C} \qquad \text{(Eq. 4)}$$

where $$B = \frac{V^2}{8AKR(f_b - f_a)}$$

and $$C = \ln k$$

From Eq. 4 it can be seen that if circuitry is used in which all parameters are maintained constant, the number of voltage peaks that exceed a predetermined threshold voltage will vary only with the temperature affecting the sensing resistance element.

Briefly described, this invention comprises a system by which temperature may be rapidly and accurately determined by amplifying the thermal noise voltages generated across a resistance by the application of heat and counting the thermal noise voltage peaks that exceed a predetermined and arbitrary threshold voltage.

An object of this inevntion is to provide means for determining temperature by the counting of voltage peaks generated by thermal noise in a conductor.

Another object of this invention is to provide means for the rapid and accurate determination of temperature of a body or bath of unknown temperature.

Still another object is to provide means for determining temperature by the counting of thermal noise voltage peaks that exceed the magnitude of a predetermined threshold voltage.

Other objects and advantages of this invention will become apparent when taken in conjunction with the accompanying claims and drawings in which:

FIG. 1 shows a block diagram of the electronic circuitry and shows in cross section the details of the preferred form of a temperature sensing element embodying this invention;

FIG. 2 shows a typical waveform pattern of the thermal noise voltage as seen at the output of the amplifier in FIG. 1;

FIG. 3 shows a typical pattern of the thermal noise voltage peaks of FIG. 2 as seen at the output of the pulse height discriminator in FIG. 1; and FIG. 4 shows a schematic diagram of electronic circuitry that may be used to amplify, discriminate, and count the thermal noise voltage peaks.

Turning now to a detailed description of the preferred embodiment of my invention, FIGURE 1 illustrates in cross section a temperature measuring probe 10 which is suitable for generating a thermal noise voltage from which temperature may be determined in accordance with the principle of this invention. The temperature probe 10 consists of a tubular housing 12 in which a temperature sensing element 14 is contained. The material used for the temperature sensing element 14 is not critical; it may be a coil of resistance wire such as tungsten, Inconel, Tophet A, etc., as shown in FIGURE 1, or for extremely high temperature measurement it may be a molten metal, or even a gas which is capable of producing a random voltage from thermal agitiation. In the embodiment shown in FIGURE 1 the resistance element 14, which may have a resistance of about 500 ohms, is connected to a pair of transmission wires 16 which conduct the thermal noise voltage generated in element 14 to the electronic measuring circuitry. As shown in FIGURE 1, the transmission wires may be supported in tube 12 by a ceramic tube 18. Radiating fins 20 on probe unit 10 may be used to reduce heating of the probe bonnet section 22 so that the transmission line 24 between the probe 10 and the electronic circuitry will not become heated. If desired, the area between the ceramic tube 18 and the probe terminals 26 may be packed with some inert material such as powdered talc to provide support for wires 16.

When a resistance element such as the element 14 of FIGURE 1 is subjected to heat, it is well known that a fluctuating noise voltage is generated in the material. This voltage is random and entirely unpredictable and may assume the waveform as shown in FIGURE 2. When a temperature sensing probe such as shown in FIGURE 1 is used to sense this random noise voltage, extra precaution must be taken to prevent extraneous outside noise from entering the system. It is therefore necessary that the probe unit 10 and the transmission lines 24 be completely shielded. It is also very desirable to keep the shielded transmission lines between the probe 10 and electronic circuitry as short as possible.

In a thermal noise voltage waveform such as is shown in FIGURE 2, the frequency of the individual noise voltages or pulses is proportional to the absolute temperature of the material in which the noise voltage is generated. That is, when the probe 10 of FIGURE 1 is subjected to an increased heat, the random noise voltage generated across the resistance element 14 will have a higher frequency and the waveform of FIGURE 2 will have more peaks per unit length of time.

In the typical noise voltage waveform of FIGURE 2 it can be seen that a high voltage peak occasionally occurs. Because these peaks appear on the waveform at comparative infrequent times, it is possible to obtain an accurate and reliable indication of absolute temperature of a resistance element 14 by counting only the peaks per unit time that appears above a threshold voltage V as shown in FIGURE 2. This is accomplished in the present invention by amplifying the thermal noise voltage in amplifier 28 and supplying the amplified voltage to a pulse height discriminator 30. The pulse height discriminator 30 contains electronic circuitry which applies a bias or threshold voltage to the amplified noise signal so that the output of discriminator 30 will be only those pulses which exceed the threshold voltage V. A typical output of discriminator 30 is shown in FIGURE 3 where it can be seen that output pulses appear only where the thermal noise voltage peaks on FIGURE 2 exceeded the threshold voltage V. If the output of the pulse height discriminator 30 is coupled to the pulse count rate meter 32 which will count the pulses per unit time, or frequency, of the voltage peaks that exceed the threshold voltage V, the output of the pulse count rate meter 32 will give an accurate and reliable indication of the absolute temperature of the sensing element 14 in the probe 20.

An electronic circuit that may be used for the determination of absolute temperature is shown in FIGURE 4. Random fluctuating thermal noise voltage generated in resistance element 40 is introduced into the first stage of an amplifier (shown in block dotted diagram and designated generally by the numeral 41) through a transformer 42. Transformer coupling to the first stage of the amplifier is most desirable since any D.C. voltage that may occur from a direct coupling may appear at the terminals of the resistance element 40 to cause a random noise voltage generated by thermoelectric effect, thus a true reading of thermal noise would not be obtained.

From FIGURE 4 it can be seen that the amplifier section consists of two stages that are transformer coupled. The second stage of the amplifier, shown also in block dotted diagram is designated generally by the numeral 41a. The amplifier stages are identical to a standard intermediate frequency amplifier of a conventional superheterodyne receiver and it is therefore felt that since this circuitry is well known to those skilled in the art, it is unnecessary to describe in detail the functions of the various parameters. It should be noted, however, that in the embodiment shown in FIGURE 4, the transformers in the amplifier circuit are tuned to a fundamental frequency of 45 kilocycles and that the bandwidth of the amplifier may be adjusted to 15 kilocycles when the gain is down 3 db. It is advisable to use a direct current in the heaters of the tubes in order to avoid an alternating current hum. It is also necessary that the amplifier section be completely and thoroughly shielded to avoid the introduction of extraneous inductively coupled signals.

The output of the amplifier of FIGURE 4 is coupled through transformer 43 and capacitor 44 into the control grid of tube 46 which comprises the first stage of a two tube pulse height discriminator and shaping network. Tubes 46 and 48 are essentially a one-shot multi-vibrator which is biased so that only voltage peaks which exceed a pre-determined biased voltage will cause an output pulse. In the quiescent state tube 48 is conducting heavily because its control grid, which is connected to its cathode through resistance 49 is at cathode potential. This high conduction of tube 48 causes a voltage drop in plate resistor 50 and therefore a relatively low voltage will appear at the output 52 as shown in the output waveform 54. This high conduction of tube 48 will also cause a large voltage drop through the cathode resistor 56 which raises the potential of the cathode of tube 46 so that conduction through tube 46 is cut off. The control grid of tube 46 is connected to the arm of a potentiometer 58 the end terminals of which are connected between +B and ground. Potentiometer 58 is adjusted so that only those voltage peaks which exceed a desired threshold voltage will overcome the bias on tube 46 and permit it to conduct.

The amplified thermal noise voltage appearing at the control grid of tube 46 may have a waveform as shown at 60, however, because of the threshold adjustment of potentiometer 58 only those waveform peaks as shown in 62 will cause conduction through tube 46. When tube 46 conducts the plate current through plate resistor 64 will cause a decrease in the voltage at the plate of tube 46 which in turn causes a decrease in the control grid voltage applied to tube 48. This decreased voltage at the control grid of tube 48 stops conduction through the tube and the voltage at the output 52 rises sharply to form a squarewave pulse as shown in 54. The height and width of this squarewave is dependent upon the parameters of the circuit. When the input pulse to the control grid of tube 46 has disappeared, tube 46 will continue to conduct until capacitor 66 discharges sufficiently to permit conduction of tube 48. Proper selection of capacitor 66 will, therefore, determine the width of the squarewave pulse appearing at the output 52. The height of the squarewave pulse is determined only by the difference in voltage drop across resistance 50 when tube 48 is either conducting or not conducting. The height of the squarewave output 52 can thereby be adjusted by proper selection of resistances 50 and 56. A selection of the parameters may be made to provide, for example, for a squarewave height of 10 volts and a width of 2 microseconds.

The squarewave pulses that have been generated to correspond to thermal noise peaks that exceed a predetermined threshold voltage are now applied to a counting circuit comprised of diodes 68 and 70, resistances 72 and capacitance 74. The purpose of this circuitry is to produce an output voltage proportional to the frequency of the uniform squarewave pulses applied to it. The squarewave pulses at the output 52 of the multivibrator circuit are applied through a capacitor 76 to the anode of diode 68. When the anode is driven positive by a positive squarewave pulse, diode 68 will conduct through resistance 72. When the squarewave ceases, the anode of diode 68 is no longer positive and conduction will cease. Charges accumulated on capacitor 76 are permitted to leak to ground through diode 70. Since a current flows through resistance 72 each time a pulse is applied, an average current flows which increases as the pulse recurrence frequency increases and decreases as this frequency decreases. This voltage drop developed across resistance 72 is then used to control the following meter stage. Capacitance 74 in parallel with resistance 72 is a large filter condenser which tends to smooth the waveform and eliminate ripple in the output voltage of the counting circuit.

The output of the counting circuit is a direct current voltage the magnitude of which is proportional to the frequency of the noise voltage pulses that exceed the threshold voltage. This direct current voltage is applied to the control grid of a triode 78 which, together with a similar triode 80, forms a push-pull balanced bridge meter circuit. In this circuit the control grid of triode 80 is connected to the arm of a potentiometer 82, the ends of which are connected between +B and ground. The arm of potentiometer 82 is adjusted so that the plate current conducted through triode 80 will equal the plate current conducted through triode 78 when no signal is received from the temperature sensing resistance element 40. The current through cathode resistance 84 will then be equal to the current through cathode resistance 86, and since both tubes are balanced, there will be no current through the milliammeter 88 which is connected between the cathodes of tubes 78 and 80. When a D.C. voltage appearing across the resistance 72 of the counting circuit is introduced into the control grid of tube 78, the conduction through tube 78 will change, thereby causing a change in current through cathode resistance 84 and also an increase in current through cathode resistor 86 through meter 88 to the cathode of tube 78. It can be seen, therefore, that any unbalance in this bridge circuit that is brought about by change in voltage introduced to the control grid tube 78 will cause a variation to be read in milliammeter 88. The current passing through milliammeter 88 is, therefore, proportional to the number of thermal noise voltage peaks exceeding the threshold voltage and to the absolute temperature of sensing resistance 40.

Calibration of the instrument does not necessitate computation of amplifier gain, frequency band width, etc. As previously shown in Equation 4, the temperature varies only in accordance with frequency of the random noise pulses. To calibrate the instrument it is only necessary to determine the values of the two constants of Equation 4. This is easily accomplished by first inserting a commercially available electronic counter at the output 52 of the multivibrator circuit in FIGURE 4 and then calibrating the instrument against an accurate thermocouple taking readings at two or more different temperatures. The electronic counter will give a direct reading of the value N of Equation 4 and the values of the constant B and C can then be readily calculated. If the circuit of FIGURE 4 is used, one may expect the value of N to be in the order of 17 kilocycles at a temperature of 500° Kelvin and in the order of 25 kilocycles at a temperature of 800° Kelvin. In order to obtain an accurate calibration and subsequent accurate readings of temperature it is necessary to allow an adequate warm up period for the electronic circuit so that all possibility of drift is eliminated.

While circuitry shown and described in the specification is only illustrated for the purpose of teaching one method of determining absolute temperature in accordance with the principle of this invention, various modifications apart from those suggested and shown may be made without departing from the spirit thereof and it is intended that the invention not be limited to what has been shown and described except to those limitations which occur in the following claims.

What is claimed is:

1. A temperature measuring instrument comprising:
   a thermal noise generating resistance element for producing a random thermal noise voltage in response to external energy applied to said element,
   electronic threshold circuitry coupled to said resistance element for applying an arbitrary preselected threshold voltage to said random thermal noise voltage generated by said resistance elment, and
   means coupled to said threshold circuitry for determining the rate at which the amplitude peaks of said thermal noise voltage exceed said threshold voltage.

2. A measuring instrument comprising:
   a random thermal noise voltage producing element sensitive to externally applied energy,
   threshold circuitry coupled to said element for applying an arbitrary pre-selected threshold voltage to the random noise voltage generated within said element, and
   counting means coupled to said threshold circuitry for determining the rate at which the noise voltage random peak amplitudes exceed said threshold voltage.

3. An absolute temperature measuring instrument comprising,
   a resistive element for generating a thermal noise voltage having a plurality of voltage peaks of randomly varying amplitudes;
   electronic amplifying circuitry coupled to said resistive element for amplifying said noise voltage generated by said resistive element;
   electronic threshold circuitry coupled to the output of said amplifying circuitry for applying an arbitrary threshold voltage to the amplified noise voltage;
   electronic counting circuitry coupled to the output of said threshold circuitry for determining the rate at which said plurality of voltage peaks of randomly varying amplitudes exceed in amplitude the value of said arbitrary threshold voltage to provide a direct current voltage indicative thereof;
   a push-pull balanced bridge meter circuit; and
   means coupling said direct current voltage to said push-pull balanced bridge meter circuit, said meter circuit being calibrated in terms of absolute temperature.

4. An absolute temperature measuring instrument comprising,
   an electrically conductive material for generating a random thermal noise voltage in accordance with the equation:
   $$E_{R.M.S.} = \sqrt{4KTR\Delta f}$$
   wherein
   $E_{R.M.S.}$ = The root mean square value of the noise voltage,
   $K$ = Boltzmann's constant,
   $T$ = Absolute temperature in degrees Kelvin,
   $R$ = The resistance of said element in ohms, and
   $\Delta f$ = The noiise bandwidth of the circuitry coupled to said element;
   amplifying means including an input and output terminal;
   means coupling said random thermal noise voltage to said input terminal of said amplifying means;
   threshold means coupled to said amplifying means for passing only those voltage peaks of said random thermal noise voltage which exceed a predetermined voltage level established by said threshold means; and
   means for converting the rate at which said voltage peaks of said random thermal noise voltage exceed said predetermined voltage level into an indication of absolute temperature.

5. A temperature measurement instrument compris- ing, an electrical resistance element for generating a random thermal noise voltage, the root-mean-square value of which varies in accordance with the thermal energy applied thereto, said random thermal noise voltage having a plurality of peaks of random amplitude;

threshold circuitry coupled to said element for applying an arbitrary predetermined threshold voltage to said random thermal noise voltage; and counting means coupled to said threshold circuitry for determining the rate at which said peaks of random amplitude exceed said arbitrary predetermined threshold voltage, said rate being indicative of the magnitude of said thermal energy applied to said element.

6. A measuring instrument as in claim 5 in which said threshold circuitry comprises adjustable means for applying an arbitrary pre-selected voltage to the random noise voltage pulses generated within the sensing element.

7. A temperature measuring instrument as in claim 1 in which said electronic threshold circuit comprises adjustable means for applying an arbitrary pre-selected threshold voltage to the random thermal noise voltage generated by the resistance element.

8. A measuring instrument as in claim 2 in which said threshold circuitry comprises adjustable means for applying an arbitrary pre-selected voltage to the random noise voltage generated within the noise voltage-producing element.

References Cited by the Examiner

UNITED STATES PATENTS

| | | | |
|---|---|---|---|
| 2,437,449 | 3/48 | Ames et al. | 73—362 |
| 2,709,799 | 5/55 | Norton | 340—227 |
| 2,731,564 | 1/56 | Edlstein | 328—3 |
| 2,834,008 | 5/58 | Carbauh | 340—227 |
| 2,903,682 | 9/59 | Van Driel | 340—227 |
| 2,946,990 | 7/60 | Klein | 340—227 |
| 2,981,938 | 4/61 | Carbauh | 340—227 |
| 3,077,111 | 2/63 | Senk et al. | 73—362 |

OTHER REFERENCES

Rice: "Mathematical Analysis of Random Noise," Bell System Technical Journal, July 1944 and January 1945.

ISAAC LISANN, *Primary Examiner.*

ROBERT B. HULL, *Examiner.*